Jan. 18, 1938. A. H. J. DE L. SAINT GENIES 2,105,797
REPRODUCTION AND PROJECTION OF GOFFERED FILMS
Filed May 2, 1935 2 Sheets-Sheet 1

INVENTOR.
Anne Henri Jacques
de Lassus Saint Genies.
By Stone, Boyden & Mack
ATTORNEYS.

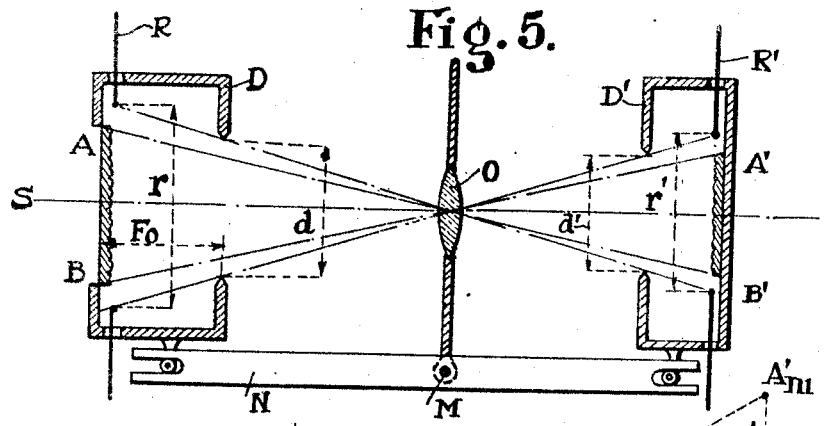
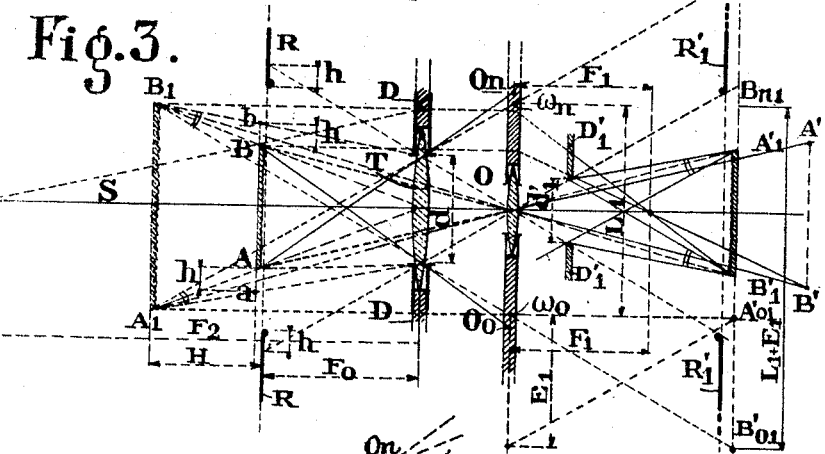
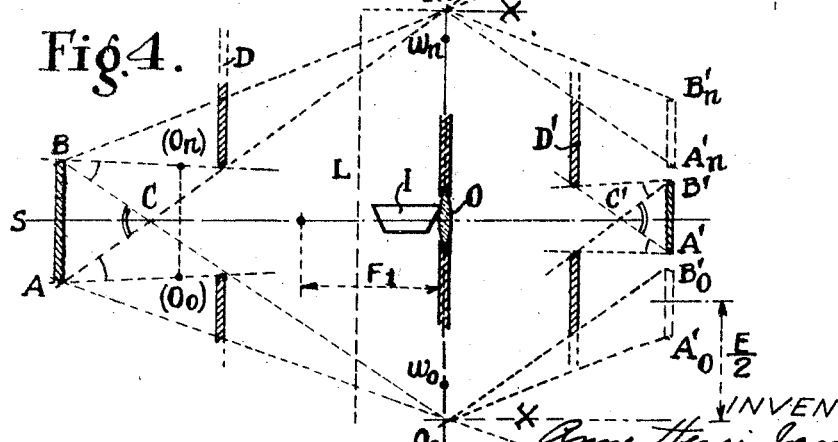

Patented Jan. 18, 1938

2,105,797

UNITED STATES PATENT OFFICE 2,105,797

REPRODUCTION AND PROJECTION OF GOFFERED FILMS

Anne Henri Jacques de Lassus Saint Genies, Versailles, France

Application May 2, 1935, Serial No. 19,490
In France May 4, 1934

14 Claims. (Cl. 88—24)

The present invention comprises a method of reproducing goffered films having recorded thereon colours or relief, or both colours and relief, of any subject. It also comprises means which ensure the satisfactory projection of the original films and copy films of this kind.

The new method according to the invention consists chiefly in giving to the two films and to the optical system, during the reproduction, homothetic relative translational displacements such that, the optical system being preferably rectilinear and stigmatic, the macroscopic image on the film remains, at a given enlargement, stationary on this film. It allows of obtaining at will, by means of optical systems of usual construction furnishing relatively small apertures, copy films which are identical, similar or not similar to the original films in their dimensions, and more particularly in the characteristics of the gofferings and in the arrangements of the elementary images on the emulsion behind each optical element of the goffering.

Figure 1:
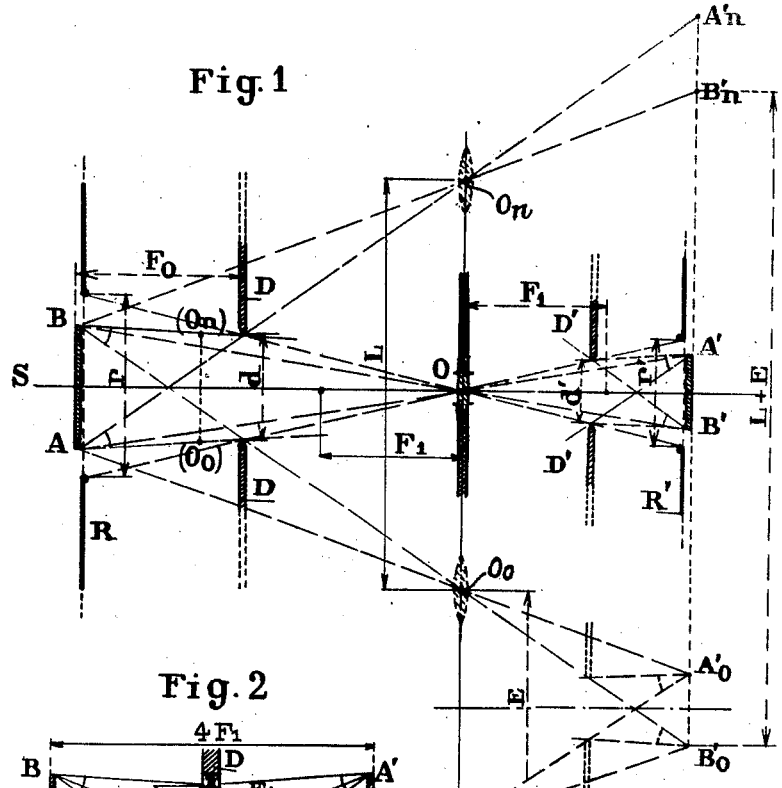
Figure 2:
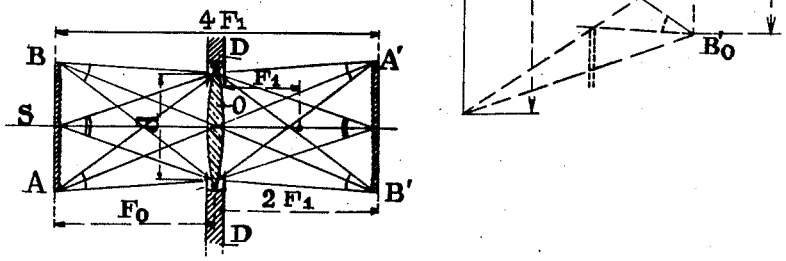

In the accompanying drawings, by way of example, and without geometrical exactitude, of course, Fig. 1 illustrates, in section through a plane containing the principal optical axis of the reproducing optical system, a diagram of an arrangement comprising two films, the gofferings of which are face to face, the optical system which separates them, and one or more shutters or screens arranged on the supporting frames or the guides for the films, the relative displacements imparted during reproduction to these different elements being due to mechanical driving and connecting members (not illustrated) which are moved by hand or by a motor;

Fig. 2 illustrates a particular case of the general arrangement of Fig. 1;

Fig. 3 illustrates, in section through a plane containing the principal axes of the reproducing optical systems, a diagram of an arrangement which differs from that of Fig. 1 only by the use of auxiliary optical systems in combination with the main optical system, this arrangement being more particularly applicable to the case of copy films which are not similar, in the characteristics of their gofferings, to the original films; and Fig. 4 illustrates a modification.

Fig. 5 illustrates schematically the operation of the shutters and screens associated with the copying system.

In Fig. 1, AB is a section of the original film through the plane of the figure. A'B' is likewise a section of the copy film, the homologous elements of the frames carrying these films being assumed to be parallel at any moment. The reproducing optical system O is, for the simplicity of illustration, assumed to comprise a thin converging lens. D and D' are shutters, the functions of which will be hereinafter explained, which have apertures $d$ and $d'$ and which are respectively integral with the supporting frames or the guides for the respective films during their movements, these frames or guides not being illustrated. R and R' are screens arranged preferably in closest contact with the films, parallel to their planes, said screens being capable of substitution for the shutters, and playing the same parts and furnishing apertures $r$ and $r'$, and being movable in front of these films, their movements during reproduction taking place, in the same manner as those of the other elements present, parallel to the plane of the figure.

The arrangement and operation of the shutters D and D' and the screens R and R' are illustrated schematically in Fig. 5.

The shutter D is provided at a distance $F_0$ from the original film AB, $F_0$ being the distance of convergence of this film. The aperture $b$ is equal to the zone of convergence. The shutter D' is arranged in a similar way with respect to the copy film A'B', $d'$ being the zone of convergence of the copy film.

These two shutters are rigidly fixed with regard to the two films respectively, and in the case in which the optical copying system is fixed, the homothetic displacements of the films can be effected by means of a lever N pivoted at M in a plane passing through the optical centre of the optical copying system. The mechanical connection is such that the respective distances between the films or the parallel planes which contain the films, and the optical centre of O remain constant.

Instead of shutters D and D' rigidly connected to the two films, it is possible to use movable screens R and R', the apertures $r$ and $r'$ of which correspond always to conical projections of the apertures $d$ and $d'$ on the respective planes of the two films coming from the optical centre of O, that means from the zones of convergence of the two films present.

It will be seen that the devices R and R' are practically equivalent to the shutters D and D' and it will be obvious that their object is to prevent all light beams emanating from AB from impinging on the optical system O except the useful light beams.

The films face one another with their goffered faces in conjugate planes relatively to the optical system O and the linings of the gofferings are parallel with one another and perpendicular to the plane of the figure if, as in the example under consideration, the gofferings are cylindrical linear gofferings. Also, if the films are cinematographic films, they are run off in the usual manner in guides containing the planes of these films and in directions generally parallel to one another, by means of known driving mechanisms (not illustrated).

Various means for effecting the relative translational movements of the different elements present are conceivable. According to the means adopted, there may be maintained stationary with the framework of the apparatus either the film AB, or the objective O or the film A'B' or the plane, normal to the plane of the figure, containing axes of suspension of these three principal elements which are obliged to make only angular oscillating movements of the same amplitudes simultaneously and movements of relative distance. A'B' remaining the conjugate of AB in the optical system O, at a given invariable enlargement during reproduction, it should be noted particularly that, if the optical system itself is undisturbed, the distance between the parallel planes containing AB and A'B' does not vary.

The original AB is correctly illuminated from the emulsion side in any relative positions of the various elements in their displacements, by suitable means arranged in the zones. The shutter D furnishes an aperture $d$ of a suitable contour, either circular or limited to two edges parallel to the lining of the goffering, etc. This aperture must occupy, at any moment, with respect to the original AB, the same position and must have the same contour as does the diaphragm containing the polychrome filter arranged in the view-taking objective for colour photography or cinematography, when viewed from the plane of the film during view-taking. In the case of photography in relief, its position and configuration must correspond to those of the diaphragm forming the pupil of emergence of the view taking objective.

The position and the configuration of the aperture $d$ in the shutter D must, of course, depend upon the form given to the surface of the film AB, which can be cylindrical for instance, as well as upon the use of eventual auxiliary lenses in the neighbourhood of the film, which modify, in known manner, the distance and the contour of the diaphragm containing the filter or zone used in view-taking, or only the distance and the contour of the aperture of the shutter used in copying.

The reproducing optical system O of any desired focal length F is displaced with a continuous movement, relatively to AB and A'B', on the largest base $L=O_oO_n$ which can be measured parallel to AB and A'B' between the limiting rays to be intercepted, which proceed from the elementary images of the edges of the original film. The aperture $d$ of the shutter D is included between AB and the optical system O in the case illustrated in the figure, or, alternatively, this aperture may be arranged by construction beyond O relatively to AB, the base L of relative displacement of the optical system O then being situated, as is indicated in dotted lines in the figure, along $(O_o)$ $(O_n)$, for instance. In the same way, $L+E$ is, in the case illustrated in the figure, the relative continuous displacement of A'B'.

The real relative displacements of the elements present may be larger than L and $L+E$, provided that they remain in the same relation $L/L+E$, the shutter D intervening at the desired points to limit the useful relative movement of exposure of the film A'B'.

The optical system O, which has the desired angular field, corresponding to its displacement relatively to the film, is stopped as much as is necessary, either by a slot parallel to the linings of the goffering, if linear gofferings are concerned, or by an orifice of suitable configuration, in the case of spherical lenticulations, so as to ensure in all cases the satisfactory delimitation of the rays coming from the elementary images of the film AB and forming the elementary images on the film A'B'.

It is understood that, by relation of elementary geometry, due to the homothetic movements of the different members, there may be provided a shutter D', of aperture $d'$, integral with the film A'B', homothetic with the shutter D relatively to O and duplicating in some manner the function of the shutter D. The two shutters may then be employed at the same time or only one of them may be employed.

One or the other of the shutters, or both, therefore strictly present the same angular aperture at homologous points of the films AB and A'B', to the elementary beams proceeding from the elementary images of AB and cooperating to form the elementary images on A'B', at the same time as there is ensured the convergence at the centre of the aperture $d'$ of D' of the median rays of the elementary beams having impressed on the film A'B', homothetically to the convergence, in the centre of $d$, an image of the median rays of the elementary beams proceeding from AB.

It is also understood, however, that either or both of these shutters may be replaced by or associated with one or both of movable screens such as R and R', of respective apertures $r$ and $r'$, each of these apertures occupying at each instant in the plane of its screen the same position with the same configuration as the conical projection of the aperture $d$ of the frame D, the optical centre O serving as projecting point, whether O is in front of or behind D relatively to AB.

If $L=E$, A'B' is identical with AB and therefore $d'$ is equal to $d$, provided, of course, that the films AB and A'B' are contained in parallel and conjugate planes in this optical system. Their respective distances from this optical system on its principal axis are in this case equal to twice the focal length $F_1$ of O.

If, under such conditions, use is made of an optical system O of focal length $F_1$ which is half the focal length $F_o$ of the view-taking objective of the film AB, the coincidence of the plane of the aperture $d$ of D with the plane of the diaphragm of this system O is ensured. During reproduction by the above method, the optical system of O traverses relatively to AB a base L equal to $d$.

In exceptional circumstances, the reproduction may take place, in this same case, without any movement of the elements present, if it is possible to give to the optical system O a diaphragm of the same contour as $d$, that is, if it is possible to give to the optical system O an aperture twice as large as that of the view-taking objective of AB. Fig. 2 illustrates this. The elementary images on A'B', however, have their right and their left inverted relatively to the elementary images AB, in the case of linear gofferings, or, alternatively, these elementary images are rotated by 180°, if the gofferings are lenticular, at the same time as, in all cases, the image A'B' is rotated by 180° relatively to AB. This will have to be taken into account in projection, whether dealing with colour, or relief, or both simultaneously.

The general method of reproduction constituting the subject of the present invention is suitable also for lenticularly goffered films, but it becomes more complicated in order to ensure the total sweeping of the emulsion of A'B' by the luminous rays during exposure. The variant of Fig. 2 corresponds to a device which, in the case where no movement may be imparted to the elements present, is also suitable, on the contrary, for all types of goffering.

In all cases of reproduction envisaged above, it is understood that the elementary cells formed by the "optical elements" of the gofferings and the zone of emulsion which corresponds to each must be capable, at homologous points of the films AB and A'B', of the same angular field. The copy films A'B' therefore cannot be correctly and easily adapted, without modification, to other optical projection systems than the view-taking optical system itself, at least, optical systems of the same relative aperture. Now, the optical projection system in halls for a copy film A'B' generally has a focal length and a relative aperture which are different from the focal length and the aperture of the view-taking objective of the original film AB; consequently, it is to be understood that different characteristics from those of the cells of the original film AB may effectively be provided for the copy film; that is, the gofferings of the original film and copies of preferably the same type may be dissimilar.

In Fig. 3, for these reasons, there has been combined with the optical system O, of focal length $F_1$, of the reproducing means of Fig. 1, an additional converging optical system T of focal length $F_2$, which is also illustrated as a thin lens. This optical system T, which coincides preferably with the plane of the shutter D, is provided to give from AB a first enlarged virtual image $A_1B_1$ which becomes the object (virtual) to be photographed by O, with $d$, for giving the final image $A_1'B_1'$ on a copy film. Regarded from O, the elementary beams proceeding from AB and converging on $d$ (their median rays passing through the centre of $d$) change into beams proceeding from $A_1B_1$ always converging on $d$, their median rays always passing through the centre of $d$.

The angular apertures of these new elementary beams such as are viewed from O in Fig. 3 are, therefore, smaller than those viewed from O in Fig. 1 for the same film AB and for the same value of $F_o$, the focal length of view-taking. The result of this, on the one hand, is that, for recording these new beams on the copy film $A'_1B'_1$, the movement of the optical system O is equal to $\omega.\omega_n$, smaller than the movement $O_o - O_n$ necessary for recording the directly perceptible elementary beams on AB without the optical auxiliary system T. The result, on the other hand, is that $d_1'$, the aerial image of $d$, is produced for new values of the magnitudes $L_1$ and $E_1$ different from L and E and that for the aerial image $d' - A'B'$ of the subject $d-AB$ similar to this subject there will be substituted an aerial image $d_1' - A'_1B'_1$ similar to the subject $d-A_1B_1$. If, therefore, it is arranged that the relation $d/F_o+H$ is equal to the relative aperture of the projection objective, the copy film $A'_1B'_1$ may be directly and correctly projected by this optical system if the image $A'_1B'_1$ is brought to the commercial size, that is, generally to the size of the original film AB.

A calculation shows very simply that there may always be made to correspond to the focal length $F_2$ (optical system T), so determined for verifying the relative aperture of the projecting objective, a focal length $F_1$ (optical system O) such that the resultant image on the film $A'_1B'_1$ is of the exact size desired. The constructions of the screens R and R' are also given in Fig. 3 with the correction $h$ for R involved by T.

In all this, it has not been taken into consideration that the copy film is presented, during reproduction, as a rotation (right and left inverted) of the original film, both being viewed by the same face. Therefore, if the original film has not, in this respect, been corrected in recording by means of a prism or mirror, or in any other suitable manner, and if it is not possible to make this correction during projection, it is necessary to employ a correcting prism when reproducing. This may be accomplished in simple manner with the arrangements of Figs. 1 and 3 wherein the small aperture of the optical system O allows any latitude for the arrangement of a mirror, or correcting prism, this prism, preferably arranged contiguously to the optical system O, having its edges parallel to the plane of the figure, the plane of the copy film A'B' or $A'_1B'_1$ then being parallel to the plane of Figure 1 or 3, and the mechanical connections modified accordingly.

Different processes being applicable to the projection, consideration will chiefly be given to the case of projection in colours, according as to whether the copy films obtained by means of the method according to the present invention are films produced by the arrangements of Figs. 1 and 2 or by the arrangement of Fig. 3.

If it is a question of the second, it has been understood above that, for employing the optical system of projection halls, everything was simple. At most, it is recommended, in the case of optical systems slightly different from that for which the goffering of the copy film $A'_1B'_1$ has been provided, to arrange in proximity to the film, on the goffering side, a converging or diverging field lens of large focal length for correcting these differences, the polychrome filter being placed in the plane which coincides with the new aerial position of $d'_1$ (integral with the film).

If it is a question of films obtained with the arrangements of Figs. 1 and 2, there is a distinction to be made. Either the copy films are identical in size with the original films, in which case the correct projection may be carried out, in particular, with an optical system identical with the view-taking optical system and adjoining, on the side of the projection screen, an auxiliary optical system adapted to bring the projected image to the dimensions of the screen; or the copy films are similar to the original films and smaller, but such that the aerial image $d'$ of $d$ furnished by these films may coincide in size with the polychrome filter in the projecting optical system, such as is viewed from the plane of the film in projecting. It is then suitable either, if desired, to arrange coincident with this filter an auxiliary converging lens of the type of the lens T of Fig. 3, adapted to give an enlarged virtual image of the copy film which is constructed in the plane corresponding to the suitable distance of the optical projection system, or it will be suitable to arrange contiguously with the optical projection system an auxiliary optical system bringing the projected image to the dimensions of the screen.

In the case of stereoscopic films with or without colour, the projection takes place on screens and by processes such as have been described in my copending patent applications Serial No. 12,511, filed March 22, 1935 and Serial No. 15,644, filed April 10th, 1935 (corresponding to French patent applications Nos. 367,475 filed April 14, 1934 and 33,708 filed August 31, 1934).

In the foregoing there has been described the use of optical means, such as a prism or mirror, for imparting to the copy the correct rotation of the right and the left of the macroscopic image of the original film, when this rotation is necessary. The same result can also be obtained by other optical means. Such means consist, during reproduction, in the combination integrally with the optical reproducing system of an optical inverter, a prism or combination of prisms, the edges of which will be preferably parallel, or perpendicular, to the linings of the gofferings of the films facing one another. This inverter, which produces the desired rotation at the same time as it can stop the reproducing optical system like to a slot parallel to the lining of the gofferings, in effect allows of maintaining parallel the planes of the two films during reproduction.

It may produce, moreover, and more particularly in the case where the enlargement of the macroscopic images in reproduction is equal to unity, interesting mechanical advantages.

Fig. 4 illustrates, in section through a plane containing the principal optical axis of the reproducing optical system, a diagram of an arrangement comprising the two films face to face, the optical reproducing system which separates them combined with an inverter, all other accessories accompanying the films such as shutters, screens, auxiliary optical systems etc., illustrated or not, being assumed to be the same as in the foregoing.

In this figure, all the elements present being designated by the same reference characters as in the above description, I represents the inverter employed, which is integral with the optical reproducing system O.

It is understood, if the edges of the inverter are parallel to the lining of the films, that the macroscopic image A'B' furnished by the optical system O—I of the macroscopic image AB of the original film will be produced at any moment, during the advancement of this optical system on its path $O_oO_n$, $(O_o)$ $(O_n)$ or $\omega o \omega n$, in a position, relatively to the principal optical axis of the optical system O, symmetrical with that which it has occupied before the addition of the inverter I which behaves, in particular, as an ideal plane mirror perpendicular to the planes of the films and to the plane of the figure.

It is also seen that the inverter must be capable of a field equal to the angle ACB, and it is understood that the value of this angle may be influenced by the addition of auxiliary lenses, either, for instance, a positive lens in the plane of the shutter D or, for instance, a negative lens in contact with the film AB as has been stated in the foregoing, or by a combination of similar lenses.

It is seen, finally, that if the optical system O is employed with an enlargement equal to unity, the image A'B' being equal to AB and L being equal to E, this image A'B' will occupy during the advancement of the optical system an invariable position such that the perpendicular at its centre will coincide at any moment with the perpendicular at the centre of the original, as if during reproduction the optical system O, provided with the inverter I, did not make any movement relatively to the films AB and A'B'.

In this particular case it will therefore be practically possible to maintain stationary with the framework of the reproducing apparatus either the optical system O, or preferably the films, the optical system O making only a simple translational movement between them on the base $O_oO_n=L$, as has been explained above.

It is obvious that there may be imparted to the illuminating source in the zone S, such a translational movement which is homothetic with the movement of O relatively to the centre of the film AB, in order to obtain the optimum efficiency of this source.

I claim:—

1. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, and shutters the circumferences of which are equal to said respective zones of convergence of each of said two films, said shutters being arranged in the respective planes of said convergence and being rigid relative to said films.

2. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, the distance between said planes of said films remaining unaltered during the movement of said films, and shutters the circumferences of which are equal to said respective zones of convergence of each of said two films, said shutters being arranged in the respective planes of said convergence and being rigid relative to said films.

3. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, and a movable screen near to said plane of one of said films, the aperture of said screen being equal to the conical projection of the zone of convergence of said one of said films on the plane of said one of said films from the center of said optical system, said aperture remaining coincident with said projection.

4. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, the distance between said planes of said films remaining unaltered during the movement of said films, and a movable screen near to said plane of one of said films, the aperture of said screen being equal to the conical projection of the zone of convergence of said one of said films on the plane of said one of said films from the center of said optical system, said aperture remaining coincident with said projection.

5. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, and movable screens, the apertures of said screens being equal to the projections of the respective zones of convergence of said films on the respective planes of said films from the center of said optical system, said apertures remaining coincident with said respective projections during their movement in planes near to said films.

6. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, the distance between said planes of said films remaining unaltered during the movement of said films, and movable screens, the apertures of said screens being equal to the projections of the respective zones of convergence of said films on the respective planes of said films from the center of said optical system, said apertures remaining coincident with said respective projections during their movement in planes near to said films.

7. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, a shutter the periphery of which is equal to said zone of convergence of one of said films, said shutter being arranged in the plane of said convergence and being rigid relative to said one of said films, and an auxiliary optical system arranged near to the aperture of said shutter for modifying the aperture of the elementary chambers of said lenticulated films.

8. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, the distance between said planes of said films remaining unaltered during the movement of said films, a shutter the periphery of which is equal to said zone of convergence of one of said films, said shutter being arranged in the plane of said convergence and being rigid relative to said one of said films, and an auxiliary optical system arranged near to the aperture of said shutter for modifying the aperture of the elementary chambers of said lenticulated films.

9. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, additional optical systems near to said films for modifying the distances of convergence of said films, and a shutter the periphery of which is equal to said zone of convergence of one of said films, said shutter being arranged in the modified plane of said convergence of one of said films and being rigid relative to said one of said films.

10. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, the distance between said planes of said films remaining unaltered during the movement of said films, additional optical systems near to said films for modifying the distances of convergence of said films, and a shutter the periphery of which is equal to said zone of convergence of one of said films, said shutter being arranged in the modified plane of said convergence of one of said films and being rigid relative to said one of said films.

11. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, additional optical systems near to said films for modifying the distances of convergence of said films, a shutter the periphery of which is equal to said zone of convergence of one of said films, said shutter being arranged in the modified plane of said convergence of one of said films and being rigid relative to said one of said films, an auxiliary optical system arranged near to the aperture of said shutter for modifying the aperture of the elementary chambers of said lenticulated films and means for displacing said additional optical systems and said shutter correspondingly.

12. An optical system for the reproduction by projection of lenticulated films comprising means for supporting the film to be reproduced in a plane, means for supporting the copy film in a plane, an optical copying system, said optical copying system having a small aperture the plane of its pupil being different from the zone of convergence of each of said films, means for moving said film to be reproduced and said copy film relatively to said optical copying system, the movements of both said films relative to said optical copying system being homothetic, said planes of said films remaining parallel to one another during the said relative movements for exposing successively the elements of said lenticulated copy film by the elementary light beams emanating from said film to be reproduced, the distance between said planes of said films remaining unaltered during the movement of said films, additional optical systems near to said films for modifying the distances of convergence of said films, a shutter the periphery of which is equal to said zone of convergence of one of said films, said shutter being arranged in the modified plane of said convergence of one of said films and being rigid relative to said one of said films, an auxiliary optical system arranged near to the aperture of said shutter for modifying the aperture of the elementary chambers of said lenticulated films and means for displacing said additional optical systems and said shutter correspondingly.

13. An optical system for the reproduction by projection of lenticulated films comprising means for supporting the film to be reproduced in a plane, means for supporting the copy film in a plane, an optical copying system having a small aperture, the plane of its pupil being different from the zone of convergence of each of said films, shutters rigid with the supports for said films and each having a window the periphery of which is equal to said respective zones of convergence, and screens movable relatively to said films in the vicinity of the films and each having a window the periphery of which is equal to the conical projections of said respective zones of convergence on the respective planes of said films from the centre of the said optical copying system, an optical inverter in the vicinity of said optical copying system, and means for moving said film to be reproduced and said copy film in the same direction and homothetically an synchronously with respect to said optical copying system, said planes of said films remaining parallel to one another perpendicularly to the axis of the copying optical system during their movement for exposing successively the elements of said copy film by the elementary light beams emanating from said film to be reproduced and the distance between the planes of said films remaining unaltered, the windows of said screens remaining coincident with said respective projections of the zones of convergence of the films during the movement of the latter.

14. An optical system for the reproduction by projection of lenticulated films comprising means for supporting a film to be reproduced in a plane, means for supporting a copy film in a plane, an optical copying system having a small aperture and adapted to produce an enlargement equal to unity, the plane of its pupil being different from the zone of convergence of each of said films, shutters rigid with the supports for said films and each having a window the periphery of which is equal to said respective zones of convergence, and screens movable relatively to said films in the vicinity of the films and each having a window the periphery of which is equal to the conical projections of said respective zones of convergence on the respective planes of said films from the centre of the said optical copying system, an optical inverter in the vicinity of said optical copying system, and means for moving said optical copying system homothetically with respect to said films, said films remaining stationary with respect to one another during this movement, the axis of the copying optical system remaining perpendicular to the planes of the films during said movement for exposing successively the elements of said copy film by the elementary light beams emanating from said film to be reproduced, the windows of said screens remaining coincident with said respective projections of the zones of convergence of the films during said movement.

ANNE HENRI JACQUES
         DE LASSUS ST. GENIES.